United States Patent [19]

Klaiber

[11] Patent Number: 5,221,708
[45] Date of Patent: Jun. 22, 1993

[54] USE OF RECOVERED POLYVINYL BUTYRAL IN THE MANUFACTURE OF FLOORING

[75] Inventor: Adolf A. Klaiber, Neuss, Fed. Rep. of Germany

[73] Assignee: Monsanto Company, St. Louis, Mo.

[21] Appl. No.: 740,745

[22] Filed: Aug. 6, 1991

[30] Foreign Application Priority Data

Aug. 13, 1990 [GB] United Kingdom ............... 9017703

[51] Int. Cl.⁵ ............................................. C08J 3/20
[52] U.S. Cl. ................................. 524/502; 524/557; 524/914; 428/500; 428/903.3; 525/57
[58] Field of Search ............... 525/57; 428/500, 903.3; 524/914, 502, 557

[56] References Cited

U.S. PATENT DOCUMENTS

| | | | |
|---|---|---|---|
| 2,552,600 | 5/1951 | Stubblebine | 525/58 |
| 3,998,792 | 12/1976 | Hermann | 525/56 |
| 4,552,915 | 11/1985 | Fujita et al. | 524/322 |
| 4,968,744 | 11/1988 | Misra et al. | 525/57 |

FOREIGN PATENT DOCUMENTS

| | | | |
|---|---|---|---|
| 470209 | 12/1950 | Canada | 525/57 |
| 455135 | 7/1975 | U.S.S.R. | 525/57 |

Primary Examiner—John Kight, III
Assistant Examiner—Rachel Johnson
Attorney, Agent, or Firm—Michael J. Murphy; Mark F. Wachter

[57] ABSTRACT

Floorings and flooring compositions containing a plasticized, preferably recovered, PVB resin. In a preferred aspect, the floorings and the flooring compositions contain a major amount of a second compatible resin such as non-plasticized PVB, and also a major amount of a composition insert filler. The floorings can contain substantially reduced levels of chlorine.

8 Claims, No Drawings

USE OF RECOVERED POLYVINYL BUTYRAL IN THE MANUFACTURE OF FLOORING

This invention relates to the use of recovered plasticized polyvinyl butyral (PVB) as a raw material component for the manufacture of flooring material, to new flooring compositions comprising recovered plasticized PVB and to flooring comprising recovered plasticized PVB.

Hereinafter the term "flooring" means synthetic flooring in the form of a finished product; "flooring composition" and "flooring material", mean compounded and processed product, generated from a raw materials mixture comprising a resin or mixture of resins with possibly other adjuvants, which is used in the manufacture of "flooring". The terms "flooring composition" and "flooring material" are used interchangeably.

Steadily increasing quantities of various resinous materials used in all areas of industry, environmental awareness and concern as shown by national and international regulations concerning the disposal of difficultly biodegradable material, and technical difficulties encountered in the recovery of such resinous materials, have created the need for efficient and economically acceptable recycling of resinous materials.

Plasticized PVB is one of the resinous materials for which no appropriate recycling was available so far. Plasticized PVB is used in large quantities, mainly as interlayer in laminated windscreens for cars. For economical and environmental reasons, the glass from laminated safety glass is recovered by conventional techniques, for example, by crushing, grinding and milling of the scrap laminated glass which provokes the release, from the PVB interlayer, of the, small glass particles. The glass so recovered is recycled.

The residual PVB is recovered as a resinous mass comprising various kinds of adjuvants and contaminants. Due to a lack of appropriate recycling possibilities, large quantities of recovered PVB resin had to be disposed of by conventional approaches inclusive of incineration and landfill.

PVB is a complex resin which may be manufactured, depending upon its application and other extrinsic factors, with large variations with respect to structural features and composition. Differences in kind of PVB resin can, for example, relate to differences in molecular weight,
differences in contents of hydroxyl, butyral and residual ester groups,
differences in type and contents of plasticizer,
differences in other various adjuvants.

Unless indicated to the contrary, the percent (%) indications hereinafter stand for percent-by-weight (% wt).

A typical PVB resin may have a molecular weight range, according to the Staudinger equation, of about 30,000 to 600,000, for example from about 40,000 to 250,000, a range of about 12% to 20%, for example about 16% to 20%, hydroxyl groups, calculated as polyvinyl alcohol, and a range of 0% to about 3% residual ester groups calculated as polyvinyl acetate.

Many different compounds, well known in the art, may be used as plasticizers for PVB. Typical ones are, for example, di-n-hexyladipate, butylbenzylphthalate, 3-ethyleneglycol ethyl-butyrate, dioctyladipate and tetraethyleneglycol heptanoate.

The contents of the plasticizers in PVB may vary largely, for example from about 5% to about 50% by weight.

Synthetic flooring has gained widespread commercial acceptance and is made from various flooring compositions which may comprise all sorts of resins or mixtures of resins. A major component of many current synthetic flooring compositions is polyvinyl chloride (PVC) which can be applied in various forms such as, e.g. plasticized PVC and PVC foam. As a matter of fact, PVC is virtually the sole polymer which is widely used in flooring materials.

For environmental and other reasons, there is an on-going effort to develop adequate resin compositions for flooring with a substantially reduced chlorine content.

Flooring materials have to fulfil several technical criteria such as, for example, abrasion and scuff resistance, stain resistance, a good balance between hardness and flexibility, compatibility with additional adjuvants such as, for example, plasticizers, fillers, UV-stabilizers, pigments and coloring agents, flame retardants and antistatic agents, the possibility of its easily industrially processing, and an economically attractive raw materials cost.

While floorings such as tiles are frequently made as a monolayer, multilayer executions compositions exhibiting different in-use properties, can also be used.

A typical multilayer flooring can contain, for example, seen from the bottom to the top, a PVC-foam layer, a colored interface, a transparent PVC-wear layer and possibly an extra top-wear layer of polyurethane or poly(meth)acrylates. This flooring can optionally be combined with a form stabilizing element such as, for example, a layer of plasticized PVC impregnated with a glass fiber mat. The flooring can also be provided with a backing layer of e.g. PVC foam or a textile mat.

It is an object of this invention to provide an environmentally, industrially and economically acceptable recycling for recovered plasticized PVB.

A further object of the invention relates to new flooring compositions which can be manufactured and further processed to new floorings at conditions comparable to conventional floorings. Still another object of this invention is to provide flooring compositions and floorings with substantially reduced levels of chlorine-containing components.

The foregoing and other objects of the invention can now be met by using recovered plasticized PVB according to the invention herein.

In detail, recovered plasticized PVB is used as a low cost, high quality raw material in the manufacture of flooring compositions with the additional advantage that such flooring compositions and floorings made therefrom contain substantially reduced chlorine levels.

In one aspect of the invention, it has been discovered that recovered plasticized PVB can be used as a raw material component, preferably as the major raw material component, for the manufacture of flooring material.

In a preferred aspect of the invention, a resin mixture comprising from about 95% to about 25% of recovered plasticized PVB resin and from about 5% to 75% of another compatible resin is used. In a more preferred aspect of the invention, the recovered PVB represents from about 95% to 60% whereas the compatible resin represents from about 5% to 40%. In another preferred aspect, a resin mixture comprising from about 90% to 80% recovered plasticized PVB and from about 10% to 20% of another compatible resin is used.

In still another preferred aspect of the invention the compatible resin is selected among compatible resins which are substantially free of plasticizer.

The invention also relates to flooring compositions and to floorings made therefrom, comprising recovered plasticized PVB or mixtures of recovered plasticized PVB and a compatible resin as described hereinbefore.

The kind of recovered PVB is not critical to the working of the invention. Suitable flooring compositions are obtained with recovered plasticized PVB of different kinds and from different manufacturing origins, as well as with mixtures of different kinds of recovered PVBs.

The kind and contents of plasticizer in the recovered PVB is not critical neither to the working of the invention. Suitable compositions are obtained from recovered PVB resins which contain different kinds of plasticizers as well as from mixtures of recovered PVBs containing two or more different plasticizers.

By "another compatible resin" is meant any resin or mixture of two or more resins which,, under known processing conditions of raw materials mixtures for flooring, is capable of forming together with the recovered PVB an adequate flooring composition.

The compatible resin can be selected from commercially available resins including homopolymers and copolymers such as, for example, PVB, PVC, PVA's (polyvinyl acetates), PEVA (polyethylvinyl acetate), PVF (polyvinyl formal), e.g. Formvar®, (registered trademark of Monsanto) NBR (nitrile butadiene rubber), and the like.

The compatible resin can be a plasticized resin containing additive levels of plasticizer, e.g. up to about 40% expressed on the compatible resin. Since, however, a considerable amount of plasticizer in the flooring composition will generally originate from the recovered plasticized PVB, the utilization of a compatible resin with low plasticizer contents, e.g. below about 15%, is preferred. In one preferred embodiment herein, a compatible resin which is substantially free of plasticizer is used.

A particularly preferred compatible resin for flooring compositions and flooring according to the invention is non-plasticized PVB such as, for example Butvar B 72® (Trademark of Monsanto Company).

Accordingly, for a given quality of recovered PVB, the selection with respect to kind and ratio of compatible resin is made such that the resulting flooring material will meet the manufacturing criteria, in particular hardness.

The appropriate ratio of recovered plasticized PVB/compatible resin can be determined experimentally according to known techniques, for example by carrying out laboratory-scale manufacturing runs under standardized processing conditions. Resin mixtures comprising varying ratios of recovered PVB /compatible resin can be used, wherein in addition the compatible resin can be varied. The results of the measurements of selected physicochemical properties, (e.g. hardness, low-temperature flexibility, water uptake) of the obtained flooring material can serve for the optimization, on a routine basis, of the choice of kind and level of the resin components and, in a similar way of the other adjuvants, of the resins mixtures.

In the compositions of the invention the plasticizer level expressed by reference to the total resin level (100%), may vary from about 5% to 50 %. Preferably the plasticizer level varies from about 15% to 40%; most preferably from about 20% to 30%.

The compositions of the invention may also comprise one or more adjuvants commonly used in flooring material such as fillers, pigments, coloring agents, UV-stabilizers, antistatic agents and flame retardants. Such adjuvants are, for example, used for their established functionality the art-established levels.

Some adjuvants can originate from the recovered PVB. The qualitative and quantitative adjuvant selection can be optimized routinely with the aid of known techniques, e.g. small-scale manufacturing runs and comparative testing of the end-product.

Recovered PVB can also contain common contaminants such as sand and remaining glass particles. During the processing steps of the PVB recovery and the manufacturing of the flooring material, these glass particles generally have become minute and act in fact, as does also sand, as a filler, and do not adversely affect to any substantial extent the use of recovered PVB.

While the level of these minute glass particles is relatively low, e.g. frequently below 2%, larger quantities up to 5% or even up to 10% can be used. The contents of other contaminants, such as e.g. sand, is low, usually below about 5%, preferable below about 2%. The levels of glass particles and sand or other contaminants are expressed by reference to the total resin level (100%) of the flooring composition.

Recovered PVB containing various kinds of adjuvants and contaminants such as e.g. plasticizer, glass, sand and others, can in the context of the invention herein be used as a raw material. However, the recovered PVB has to be substantially free of rubber and metal parts.

The preferred compositions of the intention comprising recovered plasticized PVB and non-plasticized PVB can contain higher filler contents than current flooring material from plasticized PVC. The total filler contents, composed of one or more kinds of fillers, may be up to about 150%, expressed by reference to the total resin contents. Preferably the filler level varies from about 40% to 120%. The fillers are well-established in the art. Preferred fillers are, for example, calcium carbonate, barium sulfate and aluminum trihydrate.

Scrap of flooring and recovered flooring made according to this invention can also be used as a source of recovered plasticized PVB.

The compositions of the invention comprising recovered plasticized PVB and a compatible resin, such as a non-plasticized PVB, can be routinely processed on existing equipment used for the manufacture of PVC flooring, such as for example, Banbury mixing rolls, Auma calendars (laminating rolls systems), press molds, extrusion molding equipment, and hot melt roll calendars.

The compositions of the invention are suitable for the manufacture of flooring in monolayer form, e.g. as tiles, and can also be used as a constructing element, e.g. as wear layer, in multilayer floorings.

The flooring materials of the invention can optionally be combined with other conventional flooring elements such as, e.g. dimension stabilizing elements, backing elements, foamed resin layers, adhesive layers and top wear layers.

In still another aspect of the invention the major resin components of the flooring compositions are preferably substantially chlorine-free and the flooring materials and floorings manufactured therefrom consequently contain substantially reduced chlorine contents as compared to current synthetic floorings. This applies in particular to flooring material and flooring made from a mixture of recovered PVB and non-plasticized PVB.

The invention is illustrated by the following example:

To 100 parts of a mixture of 85% plasticized PVB, recovered from scrap laminated glass and containing about 30% plasticizer, and 15% non-plasticized PVB (Butvar B72 ®); are added 100 parts of crystalline calcium carbonate filler. Optionally additive levels of 3% of pigments and stabilizers are added. The mixture is compounded on a Banbury mixer at 120° C. to 130° C., i.e. about 15° to 20° C. below the temperature normally required for PVC processing, and further processed into flooring by conventional techniques. For example, via calendar rolls a sheet of monolayer flooring is manufactured which is subsequently cut into tiles, or installed in sheetings.

Alternatively, the compounded product can be processed in the form of granules which by e.g. press-mold technique are further processed into tiles. The compounded product can, alternatively, be processed into a film, which via Auma rolls system and subsequent cutting can be processed into multilayer tiles.

Measurements made by standard techniques on monolayer tiles manufactured according to the above gave the following results:

| | |
|---|---|
| low-temperature flexibility (−19° C.) | good |
| Shore-A-Hardness | good (95 to 97) |
| dimensional stability | good (no shrinkage) |
| water pick-up | no problem (0.9%) |
| abrasion resistance | significantly better than PVC tiles. |
| scuff resistance (manual test) | good. |

I claim:

1. A flooring composition comprising plasticized polyvinyl butyral resin recovered from laminated safety glass containing minute glass particles at a level greater than 0% up to 10 weight% based on total resin content of the flooring composition.

2. A flooring composition containing a resin component and optional additives such as plasticizers and fillers wherein the resin component is a mixture of (i) from about 95% to 25% by weight of plasticized polyvinyl butyral recovered from laminated safety glass containing expressed by reference to said polyvinyl butyral, from about 5% to 50% by weight of a plasticizer and, expressed by reference to the total resin content of the flooring composition, minute glass particles at a level greater than 0% up to 10% by weight; and (ii) from about 5% to 75% by weight of a compatible resin.

3. A flooring composition of claim 2 which contains an inert filler in a level from about 40% to about 120%, expressed by reference to the resins content (100%).

4. A flooring composition of claim 2 or 3 wherein the compatible resin is substantially free of chlorine, said compatible resin being present at a level of from about 5% to 40% by weight.

5. A flooring composition according to claim 4 wherein the resin components are a mixture of recovered plasticized polyvinyl butyral and non-plasticized polyvinyl butyral.

6. A flooring composition of any of claims 3, 4 or 5 wherein the plasticized polyvinyl butyral component represents form 95% to 60% by weight, said polyvinyl butyral component containing, expressed with reference to said polyvinyl butyral (100%), from about 5% to about 50% of the plasticizer, form about 5% to about 40% by weight of the compatible resin and from about 40% to 120%, expressed by reference to the resins content (100%) of the inert filler.

7. A cover for flooring comprising plasticized polyvinyl butyral resin recovered from laminated safety glass containing minute glass particles at a level greater than 0% up to 10 weight % based on total resin content of the cover.

8. The cover according to claim y including non-plasticized polyvinyl butyral resin.

* * * * *